United States Patent
Mehrabi et al.

(10) Patent No.: US 10,368,163 B2
(45) Date of Patent: Jul. 30, 2019

(54) HEADSET POWER SUPPLY AND INPUT VOLTAGE RECOGNITION

(71) Applicant: QUALCOMM Incorporated, San Diego, CA (US)

(72) Inventors: Arash Mehrabi, San Diego, CA (US); Pradeep Charles Silva, San Diego, CA (US); Derick Hugunin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 14/506,537

(22) Filed: Oct. 3, 2014

(65) Prior Publication Data

US 2016/0100248 A1    Apr. 7, 2016

(51) Int. Cl.
| | |
|---|---|
| *H04R 3/00* | (2006.01) |
| *H04R 5/04* | (2006.01) |
| *H04R 1/10* | (2006.01) |
| *H04M 1/725* | (2006.01) |
| *H04M 1/60* | (2006.01) |

(Continued)

(52) U.S. Cl.
CPC ............ *H04R 3/00* (2013.01); *G06F 1/263* (2013.01); *G06F 1/3215* (2013.01); *H04M 1/6058* (2013.01); *H04M 1/72527* (2013.01); *H04R 5/04* (2013.01); *H04M 1/0274* (2013.01);

(Continued)

(58) Field of Classification Search
CPC ......... H04R 3/00; H04R 5/04; H04R 1/1025; H04R 1/1041; H04R 2420/05; H04M 1/6058; H04M 1/72527; H04M 1/0274; G06F 1/263; G06F 1/3215
See application file for complete search history.

(56) References Cited

U.S. PATENT DOCUMENTS

| | | | | |
|---|---|---|---|---|
| 4,276,513 A | * | 6/1981 | Johnston | ................ H03F 1/303 330/162 |
| 7,425,941 B2 | * | 9/2008 | Sung | .................... G09G 3/3688 341/144 |

(Continued)

FOREIGN PATENT DOCUMENTS

| | | |
|---|---|---|
| EP | 2317774 A2 | 5/2011 |
| EP | 2501114 A1 | 9/2012 |
| EP | 2654168 A1 | 10/2013 |

OTHER PUBLICATIONS

International Search Report and Written Opinion—PCT/US2015/047809—ISA/EPO—dated Mar. 14, 2016.

(Continued)

*Primary Examiner* — Ping Lee
(74) *Attorney, Agent, or Firm* — Arent Fox, LLP and Qualcomm, Incorporated

(57) ABSTRACT

A method and an apparatus for operating an electronic sensor and an electronic user input are provided. In one configuration, the apparatus includes a detection circuit configured to recognize a user input voltage generated by an electronic user input and a power supply configured to supply power to a detection circuit continuous without polling. In another configuration, the apparatus includes a port, a first power supply, a second power supply, and a control circuit configured to selectively couple the first power supply or the second power supply to the port based on a state of operation of an electronic sensor coupled to the port.

10 Claims, 8 Drawing Sheets

(51) Int. Cl.
*H04M 1/02* (2006.01)
*G06F 1/3215* (2019.01)
*G06F 1/26* (2006.01)

(52) U.S. Cl.
CPC .......... *H04R 1/1025* (2013.01); *H04R 1/1041* (2013.01); *H04R 2420/05* (2013.01)

(56) References Cited

U.S. PATENT DOCUMENTS

| | | | |
|---|---|---|---|
| 7,450,726 B2 | 11/2008 | Goyal | |
| 7,834,634 B2 | 11/2010 | Martin et al. | |
| 8,467,828 B2 | 6/2013 | Johnson et al. | |
| 8,509,857 B2 | 8/2013 | Enjalbert | |
| 2006/0023001 A1* | 2/2006 | Sung | G09G 3/3688 345/690 |
| 2007/0133829 A1* | 6/2007 | Kanji | H01R 29/00 381/123 |
| 2007/0296712 A1* | 12/2007 | Li | G06F 3/0362 345/184 |
| 2008/0164994 A1 | 7/2008 | Johnson et al. | |
| 2009/0179768 A1 | 7/2009 | Sander et al. | |
| 2009/0180643 A1 | 7/2009 | Sander et al. | |
| 2009/0227298 A1 | 9/2009 | Fukunaga | |
| 2010/0302028 A1 | 12/2010 | Desai et al. | |
| 2011/0103608 A1 | 5/2011 | Wu et al. | |
| 2012/0075130 A1 | 3/2012 | Zhang | |
| 2012/0237044 A1* | 9/2012 | Poulsen | H04R 1/1041 381/58 |
| 2014/0111010 A1 | 4/2014 | Kumar et al. | |

OTHER PUBLICATIONS

Partial International Search Report—PCT/US2015/047809—ISA/EPO—dated Nov. 19, 2015.

* cited by examiner

HEADSET POWER SUPPLY AND INPUT VOLTAGE RECOGNITION

BACKGROUND

Field

The disclosure relates to electronic apparatuses such as mobile communication devices or media devices, and, in particular, to the mobile communication devices or media devices with user inputs, such as a set of buttons.

Background

Wireless communication technologies and devices (e.g., cellular phones, tablets, laptops, etc.) have grown in popularity and use over the past several years. Increasingly, mobile electronic devices have grown in complexity and now commonly include multiple processors and other resources that allow mobile device users to execute complex and power intensive software applications (e.g., music player, web browsers, video streaming applications, etc.). Thus, in one example, the mobile electronic devices function as examples of media devices with video and audio functions.

The wireless communication devices or media devices may include a jack for receiving a media plug coupled to a peripheral device. For example, a mobile phone may include a jack for receiving a plug coupled to an audio headset with a microphone, which allows a user to engage in a voice conversation over the mobile phone using the headset. The headset may include an electronic user input such as a set of buttons. A user may press the buttons for various functions, such as controlling the volume of the headset. Other examples of the mobile communication devices or media devices include MP3 players, handheld gaming devices, tablets, personal computers, notebook computers, personal digital assistants, etc., while other peripheral devices include headphones, hearing-aid devices, personal computer speakers, home entertainment stereo speakers, etc.

SUMMARY

Aspects of an electronic apparatus are disclosed. The electronic apparatus includes a detection circuit configured to recognize a user input voltage generated by an electronic user input and a power supply configured to supply power to a detection circuit continuous without polling.

Further aspects of an electronic apparatus are disclosed. The electronic apparatus includes a first power supply, a second power supply, and a control circuit configured to selectively couple the first power supply or the second power supply to a detection circuit. The detection circuit is configured to recognize a user input voltage generated by an electronic user. The first power supply is configured to bias an electronic sensor for operation, and the second power supply is configured to supply a power lower than the bias for the electronic sensor for operation.

Further aspects of an electronic apparatus are disclosed. The electronic apparatus includes a port, a first power supply, a second power supply, and a control circuit configured to selectively couple the first power supply or the second power supply to the port based on a state of operation of an electronic sensor coupled to the port.

Aspects of a method for operating an electronic apparatus are disclosed. The method includes determining a state of operation of an electronic sensor coupled to a port and coupling selectively a first power supply or a second power supply to the port based on the state of operation of the electronic sensor coupled to the port.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

Figure 1:
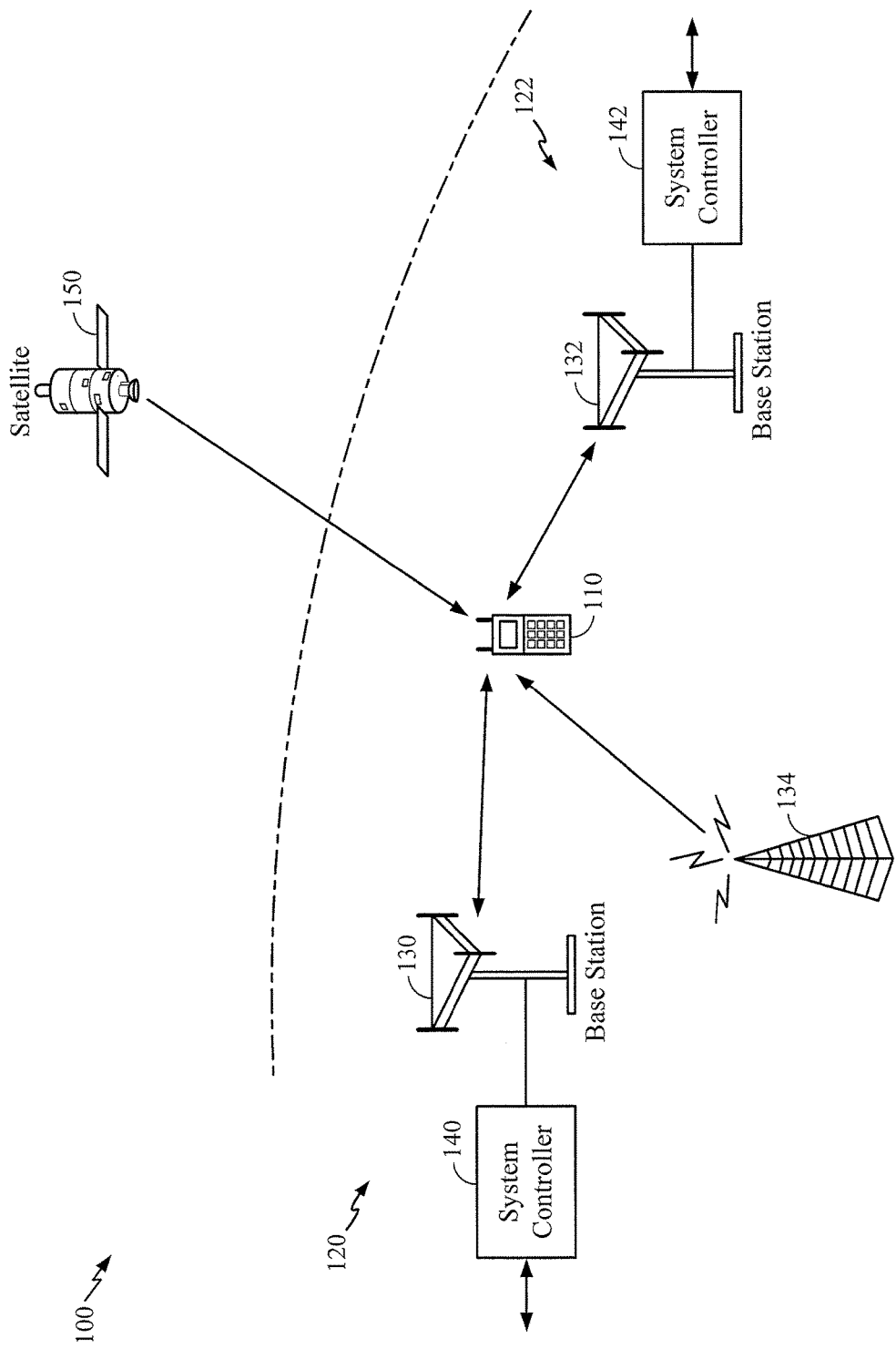
FIG. 1 illustrates a wireless communication device and communication systems in which an exemplary embodiment may be included.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. The term "exemplary" is used herein to mean "serving as an example, instance, or illustration." Any design described herein as "exemplary" is not necessarily to be construed as preferred or advantageous over other designs.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise random-access memory (RAM), read-only memory (ROM), electronically erasable programmable ROM (EEPROM), compact disk (CD) ROM (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 illustrates a wireless communication device (e.g., wireless device 110) and communication systems (e.g., wireless systems 120 and 122) in which an exemplary embodiment may be included. The wireless systems 120, 122 may each be a Code Division Multiple Access (CDMA) system, a Global System for Mobile Communications (GSM) system, a Long Term Evolution (LTE) system, a wireless local area network (WLAN) system, or some other wireless system. A CDMA system may implement Wideband CDMA (WCDMA), CDMA 1X or cdma2000, Time Division Synchronous Code Division Multiple Access (TD-SCDMA), or some other version of CDMA. TD-SCDMA is also referred to as Universal Terrestrial Radio Access (UTRA) Time Division Duplex (TDD) 1.28 Mcps Option or Low Chip Rate (LCR). LTE supports both frequency division duplexing (FDD) and time division duplexing (TDD). For example, the wireless system 120 may be a GSM system, and the wireless system 122 may be a WCDMA system. As another example, the wireless system 120 may be an LTE system, and the wireless system 122 may be a CDMA system.

For simplicity, the diagram 100 shows the wireless system 120 including one base station 130 and one system controller 140, and the wireless system 122 including one base station 132 and one system controller 142. In general, each wireless system may include any number of base stations and any set of network entities. Each base station may support communication for wireless devices within the coverage of the base station. The base stations may also be referred to as a Node B, an evolved Node B (eNB), an access point, a base transceiver station, a radio base station, a radio transceiver, a transceiver function, a basic service set (BSS), an extended service set (ESS), or some other suitable terminology. The wireless device 110 may also be referred to as a user equipment (UE), a mobile device, a remote device, a wireless device, a wireless communications device, a station, a mobile station, a subscriber station, a mobile subscriber station, a terminal, a mobile terminal, a remote terminal, a wireless terminal, an access terminal, a client, a mobile client, a mobile unit, a subscriber unit, a wireless unit, a remote unit, a handset, a user agent, or some other suitable terminology. The wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, or some other similar functioning device.

The wireless device 110 may be capable of communicating with the wireless system 120 and/or 122. The wireless device 110 may also be capable of receiving signals from broadcast stations, such as the broadcast station 134. The wireless device 110 may also be capable of receiving signals from satellites, such as the satellite 150, in one or more global navigation satellite systems (GNSS). The wireless device 110 may support one or more radio technologies for wireless communication such as GSM, WCDMA, cdma2000, LTE, 802.11, etc. The terms "radio technology," "radio access technology," "air interface," and "standard" may be used interchangeably.

The wireless device 110 may communicate with a base station in a wireless system via the downlink and the uplink. The downlink (or forward link) refers to the communication link from the base station to the wireless device, and the uplink (or reverse link) refers to the communication link from the wireless device to the base station. A wireless system may utilize TDD and/or FDD. For TDD, the downlink and the uplink share the same frequency, and downlink transmissions and uplink transmissions may be sent on the same frequency in different time periods. For FDD, the downlink and the uplink are allocated separate frequencies. Downlink transmissions may be sent on one frequency, and uplink transmissions may be sent on another frequency. Some exemplary radio technologies supporting TDD include GSM, LTE, and TD-SCDMA. Some exemplary radio technologies supporting FDD include WCDMA, cdma2000, and LTE.

Figure 2:
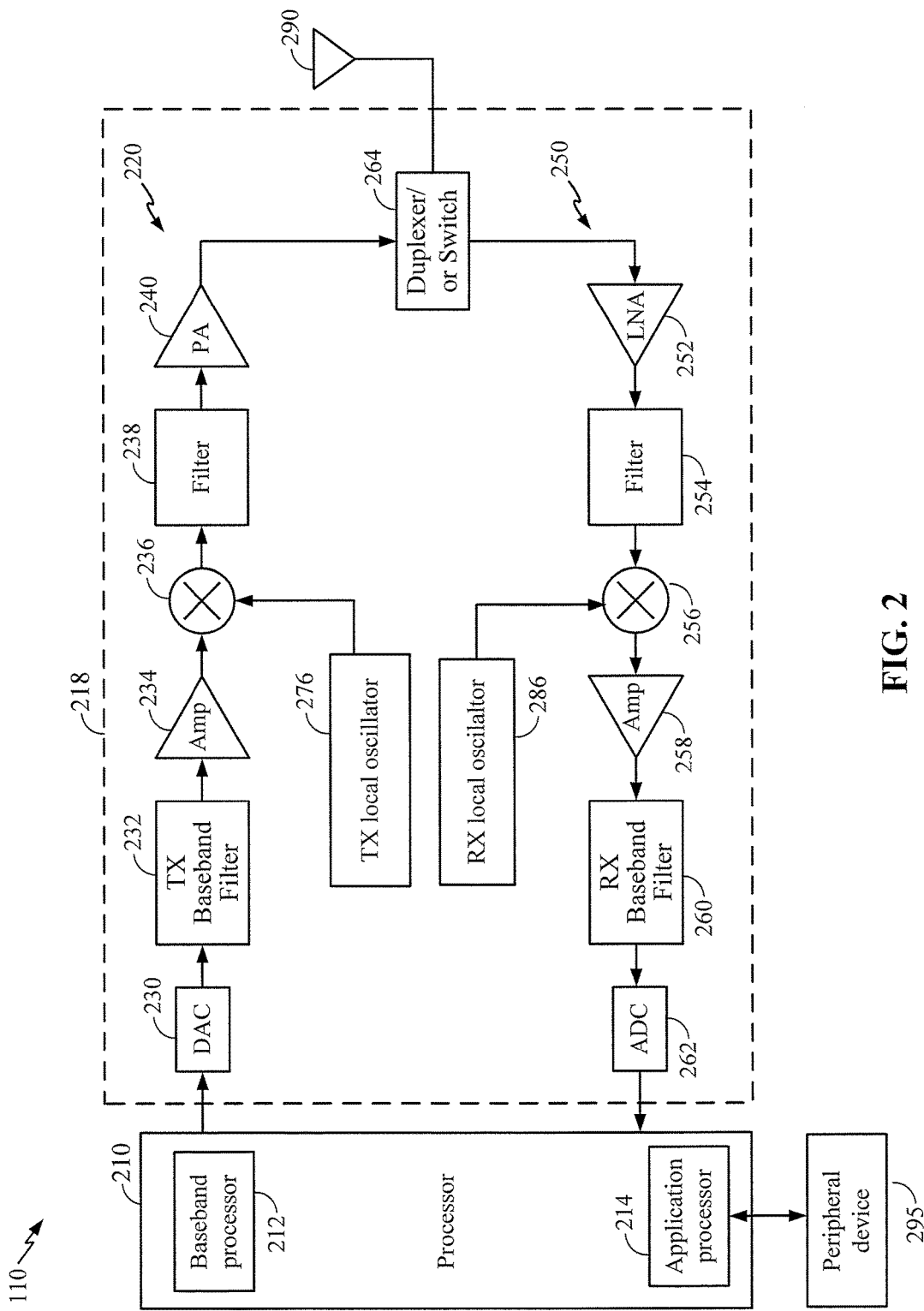
FIG. 2 is a block diagram of a wireless communication device in which an exemplary embodiment may be included.

FIG. 2 illustrates a block diagram of a wireless communication device (such as the wireless device 110) in which an exemplary embodiment may be included. The wireless transceiver 218 includes a transmitter 220 and a receiver 250 that support bi-directional communication. The transmitter 220 and/or the receiver 250 may be implemented with a super-heterodyne architecture or direct-conversion architecture. In the super-heterodyne architecture, a signal is frequency converted between RF and baseband in multiple stages (e.g., from RF to an intermediate frequency (IF) in one stage, and then from IF to baseband in another stage for a receiver). In the direct-conversion architecture, which is also referred to as a zero-IF architecture, a signal is frequency converted between RF and baseband in one stage. The super-heterodyne and direct-conversion architectures may use different circuit blocks and/or have different requirements. In the exemplary embodiment shown in FIG. 2, the transmitter 220 and the receiver 250 are implemented with a direct-conversion architecture.

In the transmit path, the baseband processor 212 provides data to a digital-to-analog converter (DAC) 230. The DAC 230 converts a digital input signal to an analog output signal. The analog output signal is provided to a filter 232, which filters the analog output signal to remove images caused by the prior digital-to-analog conversion by the DAC 230. An amplifier 234 is used to amplify the signal from the filter 232 to provide an amplified baseband signal. A mixer 236 receives the amplified baseband signal and an LO signal from TX local oscillator 276. The mixer 236 mixes the amplified baseband signal with the LO signal to provide an upconverted signal. A filter 238 is used to filter the upconverted signal to remove images caused by the frequency mixing. A power amplifier (PA) 240 is used to amplify the signal from the filter 238 to obtain an output RF signal at the desired output power level. The output RF signal is routed through a duplexer 264 to the antenna 290 for transmission over the wireless channel.

In the receive path, the antenna 290 may receive signals transmitted by a remote device. The received RF signal may be routed through the duplexer 264 to the receiver 250. Within the receiver 250, the received RF signal is amplified by a low noise amplifier (LNA) 252 and filtered by a filter 254 and to obtain an input RF signal. A mixer 256 receive the input RF signal and an LO signal from a RX local oscillator 286. The mixer 256 mixes the input RF signal with the LO signal to provide a downconverted signal. The downconverted signal is amplified by an amplifier 258 to obtain an amplified downconverted signal. A filter 260 is used to filter the amplified downconverted signal to remove images caused by the frequency mixing. The signal from the filter 260 is provided to an analog-to-digital converter (ADC) 262. The ADC 262 converts the signal to a digital output signal. The digital output signal may be provided to the baseband processor 212 for further processing. The ADC 262 may be a delta-sigma type ADC including an exemplary embodiment of an OTA performing the integration function.

The conditioning of the signals in the transmitter 220 and the receiver 250 may be performed by one or more stages of amplifiers, filters, mixers, etc. These circuits may be arranged differently from the configuration shown in FIG. 2. Furthermore, other circuits not shown in FIG. 2 may also be used to condition the signals in the transmitter 220 and the receiver 250. For example, impedance matching circuits may be located at the output of the PA 240, at the input of the LNA 252, between the antenna 290 and the duplexer 264, etc.

The wireless transceiver 218 communicates with the processor system 210. In particular, the processor system 210 may include a baseband processor to processing the signals to and from the wireless transceiver 218. The wireless transceiver 218 may further include an application processor 214. The application processor 214 processes various applications of the wireless device 110, such as music player, web browsers, video streaming applications. In one example, a peripheral device 295 (such as a headset including a microphone and buttons for user input) is attached to the wireless device 110 and communicates with the application processor 214.

As the applications of the wireless communication devices grow, various electronic sensors may be attached to or included in the wireless device 110. An example of such electronic sensors is a microphone. A microphone may be an acoustic-to-electric transducer or sensor that converts sound in air into an electrical signal and may be used for telephone conversation. Moreover, various electronic user inputs may be attached to or included in the wireless device 110. An example of such electronic user inputs is a multi-button user input. The multi-button user input may be attached to the microphone and control the volume of the wireless device 110. The wireless device 110 may include a detection circuit to recognize the input (e.g., voltage) received from the multi-button user input. The detection circuit draws current even when the multi-button user input is not in use (e.g., the user is not using any button). Moreover, since the detection circuit is powered by the microphone bias (a power supply for powering the microphone operation), which may be a relatively high voltage, the detection circuit may draw significant current even when the microphone is idle.

To conserve the current consumption of the wireless device 110, one solution is to poll the detection circuit. The detection circuit would thus be disabled for, e.g., a predetermined period of time, and then woken up periodically to detect and/or to recognize the user input voltage from the multi-button user input. In a case that the multi-button user input is attached to earphones, such turning on and turning off of the detection circuit may introduce noise into the system.

Figure 3:
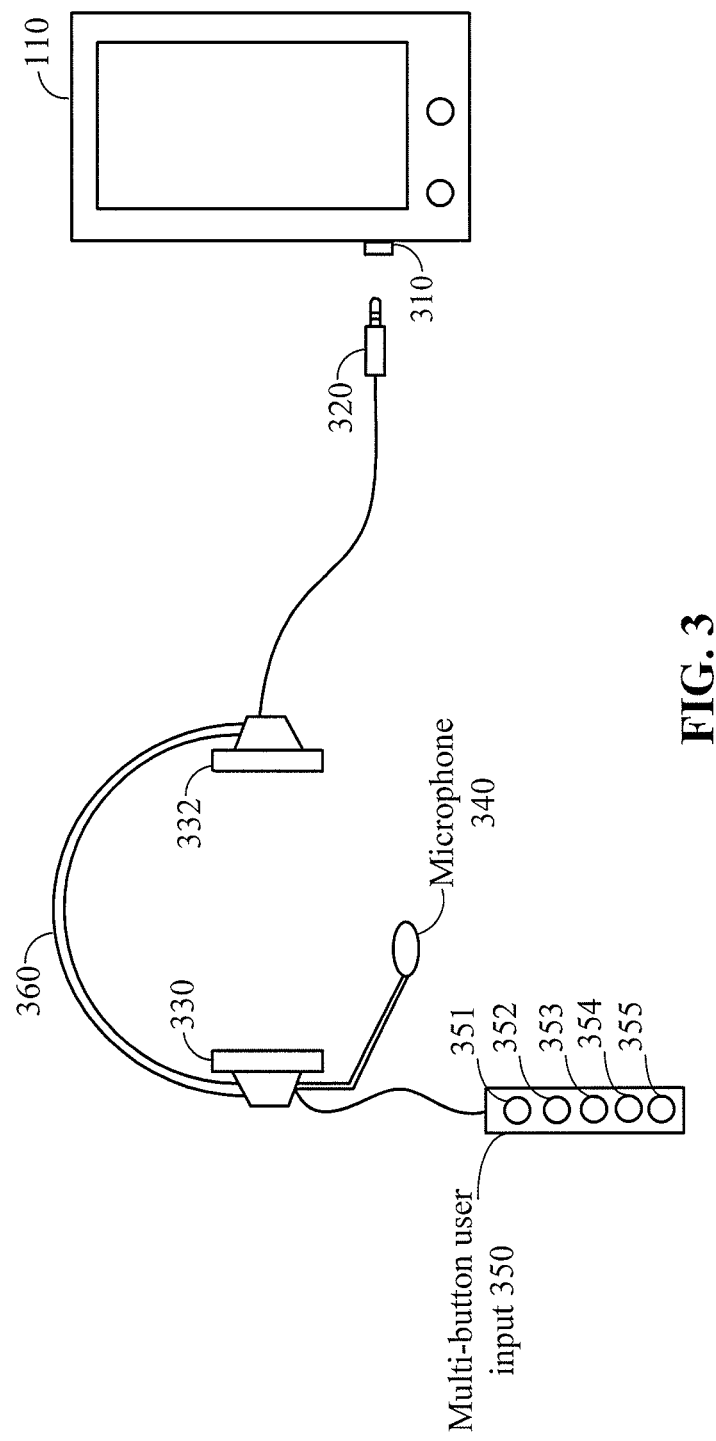
FIG. 3 illustrates an exemplary embodiment including a wireless communication device and a headset.

FIG. 3 an exemplary embodiment including a wireless communication device (e.g., wireless device 110) and a headset (e.g., headset 360). The headset 360 is an example of the peripheral device 295 and includes earphones (speakers) 330 and 332 for producing sounds. The headset 360 further includes a microphone 340 and a multi-button user input 350. The multi-button user input 350 includes buttons 351-355. In this example, the microphone 340 and the multi-button user input 350 are external to the wireless device 110. The headset 360 includes a plug 320, which is insertable into a jack 310 of the wireless device 110. (Note that the jack 310 needs not extrude from the surface of the wireless device 110 as shown by FIG. 3). In one example, the plug 320 is a LRGM-type plug and includes multiple pins (e.g., left audio, right audio, ground, and microphone pins). The jack 310 therefore likewise connects to the multiple pins. In one example, the wireless device 110 receives the user input voltage from the multi-button user input 350 via the plug 320 and the jack 310 (e.g., via the microphone pin). In another example, the wireless device 110 provides power (e.g., voltages) to the microphone 340 and/or the multi-button user input 350 via the plug 320 and the jack 310 (e.g., via the microphone pin). In one example, the plug 320 is a LRGM-type plug and includes a pin for providing signal/power to a left speaker (L), a pin for providing power/signal for a right speaker (R), a pin for ground (G), and a pin for biasing the microphone (M). The wireless device 110 provides power (e.g., voltages) to the microphone 340 and/or the multi-button user input 350 via the pin for biasing the microphone.

Figure 4:
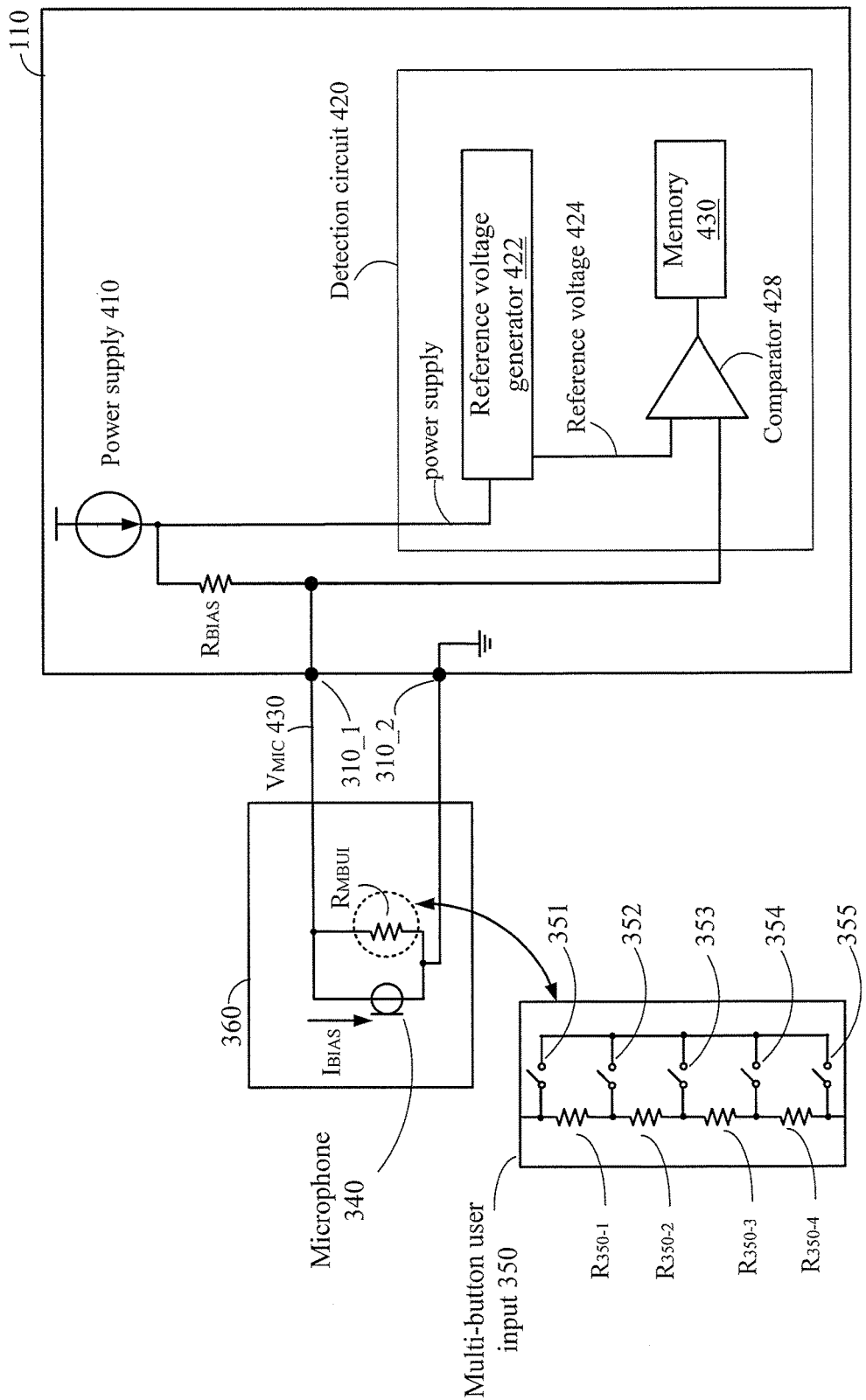
FIG. 4 is a block diagram of an exemplary embodiment including a wireless communication device and a headset.

FIG. 4 is a block diagram of an exemplary embodiment including a wireless communication device (e.g., wireless device 110) and a headset (e.g., headset 360). The headset 360 includes a microphone 340. An example of the microphone 340 is a transducer, which operates on a bias current $I_{BIAS}$. The microphone 340 is coupled (e.g., electrically connected) to the multi-button user input 350. For example, the microphone 340 and the multi-button user input 350 share a same power supply 410 (e.g., a voltage or current source). The multi-button user input 350 includes buttons 351-355 (shown as switches) and resistors $R_{350-1}$, $R_{350-2}$, $R_{350-3}$, and $R_{350-4}$ connected in series. Based on the button pressed, the multi-button user input 350 provides an equivalent resistance $R_{MBUI}$. For example, when no button is pressed, the equivalent resistance $R_{MBUI}$ is infinite as no conductive paths are formed via the resistors. equals the sum of the resistors $R_{350-1}$, $R_{350-2}$, $R_{350-3}$, and $R_{350-4}$. When the button 351 is pressed, the resistors $R_{350-1}$, $R_{350-2}$, $R_{350-3}$, and $R_{350-4}$ are shorted, and the equivalent resistance $R_{MBUI}$ is zero. When the button 352 is pressed, the equivalent resistance $R_{MBUI}$ is that of the resistors $R_{350-1}$, and so forth. Based on the power supply 410, the resistor $R_{BIAS}$, and the equivalent resistance $R_{MBUT}$, a user input voltage $V_{MIC}$ 432 is generated based on the button pressed. When a button is pressed, the resistance of the microphone 340 may be substantially larger than the equivalent resistance $R_{MBUT}$ and therefore, may have minimum impact on the generated user input voltage $V_{MIC}$ 432.

In one example, the headset 360 is external to the wireless device 110, and couples thereto via an input/output port (e.g., the jack 310) of the wireless device 110. The user input voltage $V_{MIC}$ 432 is also provided to the wireless device 110. In one example, the user input voltage $V_{MIC}$ 432 is likewise coupled to the wireless device 110 via the input/output port (e.g., the jack 310). In one implementation, the headset 360 is coupled to the microphone pin 310_1 (e.g., at the $V_{MIC}$ node) and the ground pin 310_2. In one example, the microphone pin 310_1 and the ground pin 310_2 are part of the LRGM plug. In another example, the microphone 340 and the multi-button user input 350 may be part of the wireless device 110.

The wireless device 110 includes a power supply 410 and a detection circuit 420. The power supply 410 (e.g., a voltage or current source) provides the bias current $I_{BIAS}$ to the microphone 340 for operation and the power to generate the user input voltage $V_{MIC}$ 432. The power supply 410 provides the power to the headset 360 via an input/output port (e.g., the jack 310). The detection circuit 420 is configured to recognize the user input voltage $V_{MIC}$ 432 generated by the multi-button user input 350. The detection circuit 420 includes a reference voltage generator 422, which generate the reference voltage 424. A comparator 428 compares the user input voltage $V_{MIC}$ 432 and the reference voltage 424. The results of the comparisons are stored in the memory 430. In one example, power supply 410 supplies power to the reference voltage generator 422 and/or the detection circuit 420 continuous and without polling. Thus, the reference voltage generator 422 and/or the detection circuit 420 are constantly on. In one example, the reference voltage generator 422 generates a plurality of reference voltages (as the reference voltage 424) in a sequence. The comparator 428 thus compares the sequence of reference voltages (as the reference voltage 424) to the user input voltage $V_{MIC}$ 432, and the results are stored in the memory 430 in the sequence the reference voltages (as the reference voltage 424) being generated. In one example, the detection circuit 420 recognizes the user input voltage $V_{MIC}$ 432 (and therefore, which button the user pressed) based on the results stored in the memory 430, as described below.

Figure 5:
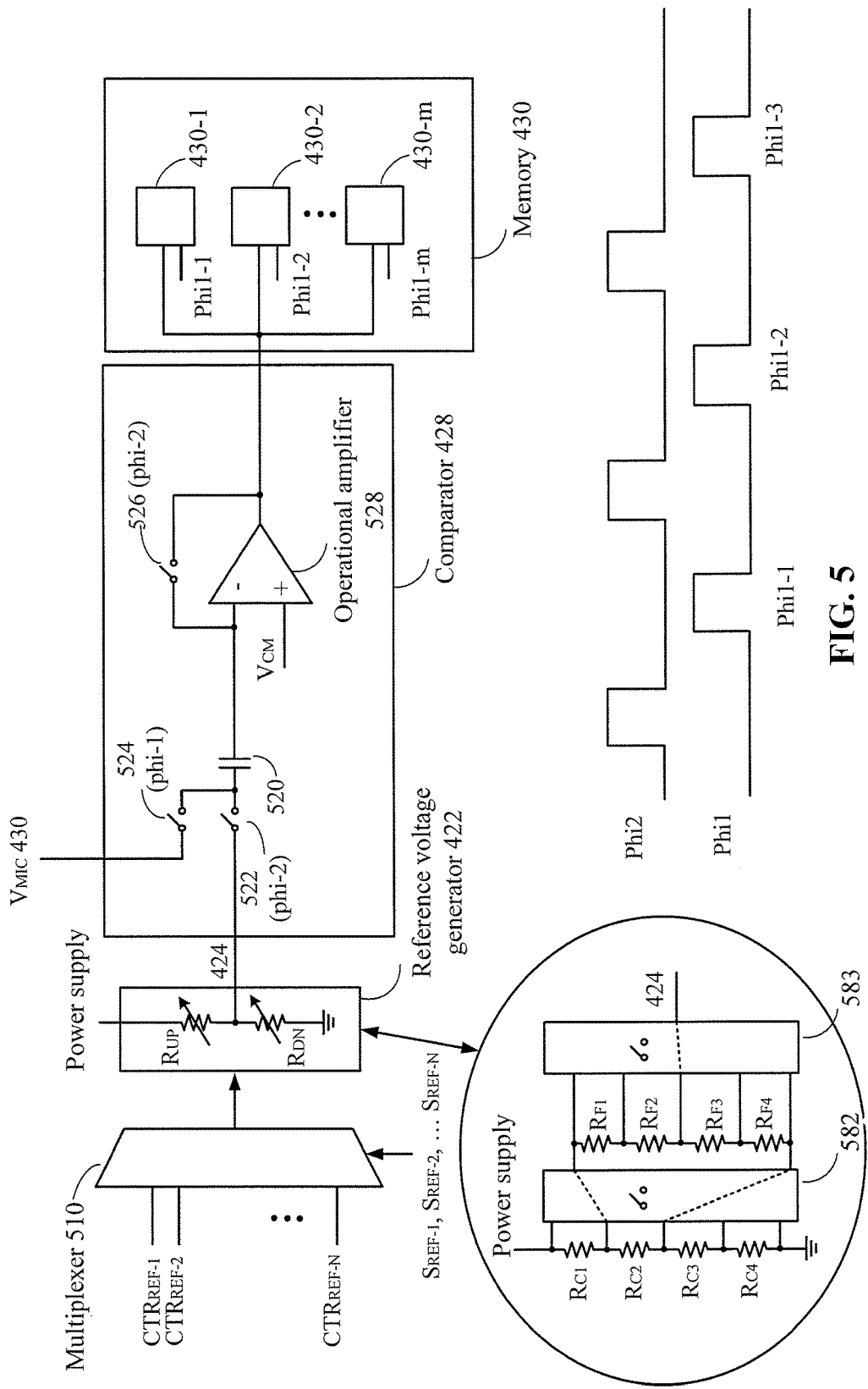
FIG. 5 is a block diagram of an exemplary embodiment of the detection circuit.

FIG. 5 is a block diagram of an exemplary embodiment of the detection circuit (420). In one example, the reference voltage generator 422 includes a voltage divider, which includes a programmable resistor $R_{UP}$ and a programmable resistor $R_{DN}$ and receives power from the power supply 410 (FIG. 4). A programmable resistor may include a plurality of resistors in series, and a plurality of switches shorting the resistors in response to control signals. The control signals to program the programmable resistor $R_{UP}$ and the programmable resistor $R_{DN}$, $CTR_{REF-1}$-$CRR_{REF-N}$, are supplied by a multiplexer 510. For example, when the control signal $CTR_{REF-1}$ is supplied to the reference voltage generator 422, the reference voltage generator 422 outputs a reference voltage 424 at voltage level $V_{REF-1}$. When the control signal $CTR_{REF-N}$ is supplied to the reference voltage generator 422, the reference voltage generator 422 outputs a reference voltage 424 at voltage level $V_{REF-N}$, and so forth.

In another example, the reference voltage generator 422 includes a voltage divider, which includes a set of coarse resistors ($R_{C1}$-$R_{C4}$) connected in series and a set of fine resistors ($R_{F1}$-$R_{F4}$) connected in series. The voltage drops across each of the set of coarse transistors ($R_{C1}$-$R_{C4}$) and the set of fine transistors ($R_{F1}$-$R_{F4}$) may be uniform for each set of resistors. A first set of switches (transistors, pass-gates, etc.,) 582 selectively couples the set of fine resistors ($R_{F1}$-$R_{F4}$) to one resistor of the coarse resistors ($R_{C1}$-$R_{C4}$), thereby selects the voltage across the selectively coupled one resistor of the coarse resistors. A second set of switches 583 further selectively couples a voltage on the set of fine resistors ($R_{F1}$-$R_{F4}$) to the reference voltage 424. In the example shown, the set of fine resistors ($R_{F1}$-$R_{F4}$) is coupled to the coarse resistor $R_{C2}$. Thus, the voltage across the coarse resistor $R_{C2}$ is selected for the reference voltage 424. The voltage across the coarse resistor $R_{C2}$ further divided by the set of fine resistors ($R_{F1}$-$R_{F4}$). In the example shown, the voltage between the fine resistors $R_{F2}$-$R_{F3}$ (i.e., 50% of the voltage across the coarse resistor $R_{C2}$) is selected for the reference voltage 424. The first set of switches 582 and the second set of switches 583 may be controlled by the $CTR_{REF-1}$-$CRR_{REF-N}$ as described above and below.

The multiplexer 510 selects the control signals (and therefore, the reference voltage 424) in response to selection signals $S_{REF-1}$-$S_{REF-N}$. The selection signals $S_{REF-1}$-$S_{REF-N}$ may be outputted by a counter (not shown). In an example, as the counter counts, the reference voltage generator 422 outputs the reference voltage 424 at $V_{R1}$, $V_{R2}$, ... $V_{RN}$, based on a sequence determined by the counter. The sequence may be in the order of increasing or decreasing the voltage level of the reference voltage 424, but needs not be so limited. In one example, the reference voltages generated and/or the sequence generating the reference voltages may be programmable, e.g., by software. In this manner, the wireless device 110 may operate with headsets manufactured by different venders.

The comparator 428 may be, for example, an auto-zero amplifier. The comparator 428 includes an operational amplifier 528, a capacitor 520, and switches 522, 524, and 526. The switches may be, for example, transistors or pass-gates. The positive input (+) of the operational amplifier 528 receives $V_{CM}$, which is a reference voltage for the operational amplifier 528. In one example, $V_{CM}$ is ground. When the clock phi2 is active (e.g., in a high state), the switches 526 and 522 are closed, and the switch 524 is open. The negative input (−) of the operational amplifier 528 is connected to the output of the operational amplifier 528, which may be ground based on the value of $V_{CM}$. A voltage $V_{CAP}$ is placed across the capacitor 520. The voltage $V_{CAP}$ may be the reference voltage 424 plus an offset voltage (e.g., a DC offset). When the clock phi1 is active (e.g., in a high state), the switches 526 and 522 are open, and the switch 524 is closed. Upon closing the switch 524, the user input voltage $V_{MIC}$ 432 pluses the same offset voltage is placed on one end of the capacitor 520. The transient response of the capacitor 520 preserves the voltage $V_{CAP}$, and therefore, the voltage at the negative input (−) of operational amplifier 528 becomes ($V_{MIC}$+offset voltage)−(reference voltage 424+offset voltage).

Therefore, the voltage at the negative input (−) of operational amplifier 528 is the user input voltage $V_{MIC}$ 432 subtracted by the reference voltage 424. The operational amplifier 528 thus compares a difference between the user input voltage $V_{MIC}$ 432 and the reference voltage 424 (regardless of the value of the reference voltage 424).

In one example, the detection circuit 420 may operate on a continuous and relatively slow clock (e.g., in the kHZ range). In this example, the low power and low offset solution can be achieved with a continuous time comparator with auto-zeroing. In one example, the comparator 428 use a high-gain first stage, followed by an inverter to minimize loading on the output. A telescopic operational transconductance amplifier may be used for first stage of the comparator 428 to ensure unity-gain stability during an auto-zero phase. In one example, no output capacitor during the amplification phase increases comparator speed. However, noise folding over into baseband may be increased due to very high bandwidth.

The memory 430 includes m storage elements 430-1 to 430-m. The storage elements may be latches, flip-flops, or other known storage means. During each clock phi1 activation phase, the comparison result is stored in each of the m storage elements 430-1-430-m. Thus, m comparison results may be stored in the sequence the reference voltage 424 is generated. For example, a user presses a button on the multi-button user input 350 and generates a user input voltage $V_{MIC}$ 432.

In one example, the clock phi1-1 (the first clock phi1 activation phase), the reference voltage 424 is at $V_{R1}$, and the user input voltage $V_{MIC}$ 432 is below the reference voltage 424 ($V_{R1}$). The comparator 428 outputs a "0" value (e.g., a low level). The storage element 430-1 thus stores the "0" value. At clock phi1-2 (the second clock phi1 activation phase), the reference voltage 424 is at $V_{R2}$ (which is lower than $V_{R1}$, for example) according to the sequence, and the user input voltage $V_{MIC}$ 432 is, e.g., greater than the reference voltage 424 ($V_{R2}$). Thus, the comparator 428 outputs a "1" value, which is stored by the storage element 430-2. In one example, the detection circuit 420 may thus recognize the user input voltage $V_{MIC}$ 432 is between $V_{R1}$ and $V_{R2}$, based on the stored results of the storage elements 430-1 and 430-2.

In another example, the detection circuit 420 may recognize the user input voltage $V_{MIC}$ 432 based on the results being stored in the storage elements 430-1 and 430-m for a predetermined period of time or cycles. Such predetermined period of time or cycles may be used for debouncing measures. When the user presses a button on the multi-button user input 350, bounces may be generated. The bounces may be a series of short pulses. By recognizing the user input voltage $V_{MIC}$ 432 based on the results being stored in the storage elements 430-1 and 430-m for at least the predetermined period of time or cycles, the detection circuit 420 can avoid erroneously recognizing the bounces. Continuing with the above example, at clock phi1-3 (the third clock phi1 activation phase), the reference voltage 424 is at $V_{R3}$ (which is lower than $V_{R2}$, for example) according to the sequence. Given the stored values of the storage elements 430-1 and 430-2, the detection circuit 420 expects to find a value "1" stored in the storage element 430-3. In a case that the detection circuit 420 finds that a value "0" is stored in the storage element 430-3, the detection circuit 420 may recognize that the stored results indicate bounces and not a valid user input.

In another example, the predetermined time or cycles for recognizing an input voltage is not a bounce may be programmed by a register and counted by a de-bouncing counter. The clock phi1 (or a divided-down version thereof) may be used as the clock for the de-bouncing counter. The de-bouncing counter counts up to a register-defined value and is reset when any outputs change state. When the counter reaches the set value, the state of the stored compare results can be used to determine which button was pressed. In one example, the clock phi2 activation phase may be the auto-zero phase. In this phase, the programmable resistor $R_{UP}$ and the programmable resistor $R_{DN}$ may be programmed to generate the reference voltage 424. The clock phi1 activation may be the amplification phase. In one implementation, the predetermined time or cycle for recognizing a bounce is 10-100 s of clock cycles. The system resets if a change in the memory state is detected in the 10-100 s of clock cycles.

In one implementation, the detection circuit 420 may be configured to operate at low power, and therefore, the power supply 410 may continue to supply power to the detection 420 without polling. For example, the resistors $R_{UP}$ and $R_{DN}$ of the power supply 422 may be of larger resistances than the resistors of the multi-button user input 350.

In one implementation, the detection circuit 420 may include multiple reference voltage generators 422 generating multiple reference voltages 424 and multiple comparators 428. The detection circuit 420 is configured to compare, via the multiple comparators 428, the user input voltage (e.g., $V_{MIC}$ 430) generated by the multi-button user input 350 with the multiple of reference voltages 424 in parallel. In this implementation, the reference voltage 424 needs not be generated in a sequence.

Figure 6:
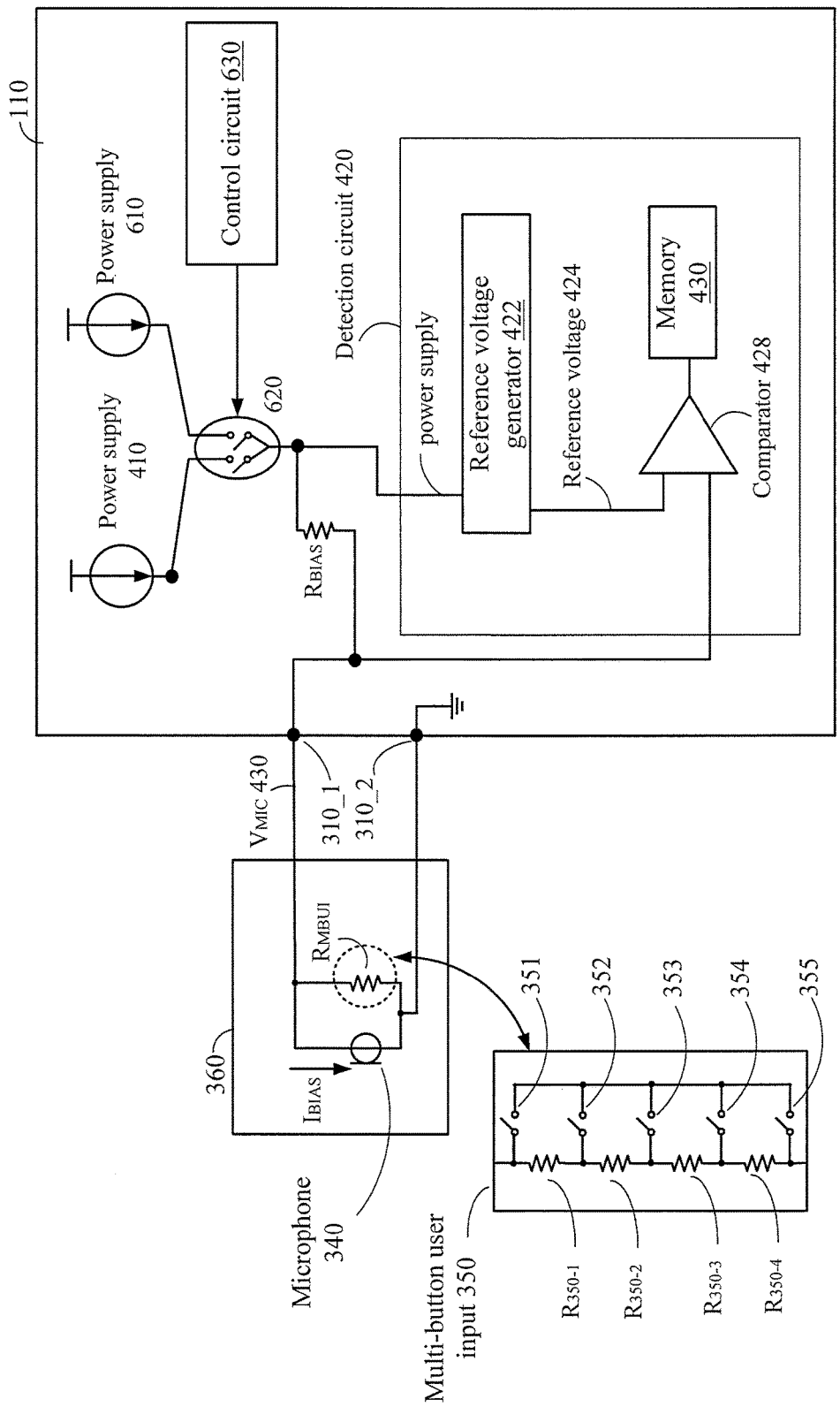
FIG. 6 is a block diagram of another exemplary embodiment including a wireless communication device and a headset.

FIG. 6 is a block diagram of another exemplary embodiment including a wireless communication device (e.g., wireless device 110) and a headset (e.g., headset 360). The wireless device 110 includes power sources such as the power supply 410 and the current source 610. The control circuit 630 selectively couples (e.g., electrically connects) the power supply 410 or the power supply 610 to the input/output port (e.g., the jack 310). Thus, the control circuit 630 selectively couples (e.g., electrically connects) the power supply 410 or the power supply 610 to the microphone 340 and/or the multi-button user input 350, which are/is coupled to the jack 310 (e.g., via the pins 310_1 and 310_2). In one example, the power supply 410 or the power supply 610 is selected via a switch 620. A switch may be transistors or pass-gates, or any other switches known in the art. The control circuit 630 generates the signals controlling the switch 620. Examples of the control circuit 630 may include circuits for generating the signals, processors for generating the signals, circuits for generating the signals in response to software programming, or any combination of these examples. The detection circuit 420 may be powered by the power supply 410 or the power supply 610, but may remain active continuous without polling.

In one example, the control circuit 630 selects the power source to couple to the multi-button user input 350 and the detection circuit 420 based on a state of operation of the microphone 340. For example the power supply 410 may be configured to supply at least the bias current $I_{BIAS}$, which biases the microphone 340 for operation. Thus, when the microphone is in an operating state, the control circuit 630 selects the power supply 410 to couple to the jack 310 and the microphone 340/multi-button user input 350. The selected power 410 likewise powers the detection circuit 420 as described in FIG. 4. The wireless device 110 may determine that the microphone 340 is in the operation state using known methods in the art, such as recognizing an application associated with a microphone being active or a feedback from the microphone 340. When the microphone 340 is not in the operation state, the control circuit 630 selects the power supply 610 to couple to the multi-button user input 350 (and therefore the microphone 340) and the detection circuit 420. Because the microphone 340 is not in operation, the power supply 610 needs not supply the bias current $I_{BIAS}$. For example, the power supply 610 may be configured to supply a power less than the bias current $I_{BIAS}$ for the multi-button user input 350 and thereby reduces power consumption in this configuration. The exemplary embodiment therefore operates without polling the detection circuit 420.

Various features of an exemplary embodiment are presented below. For example, an electronic apparatus (e.g., wireless device 110) may include a port (e.g., jack 310). The electronic apparatus may further include a first power supply (e.g., power supply 410) and a second power supply (e.g., power supply 410). A control circuit (e.g., control circuit 630) may be configured to selectively couple the first power supply or the second power supply to the port based on a state of operation of an electronic sensor (e.g., the microphone 340) coupled to the port. A detection circuit (e.g., detection circuit 420) may be configured to recognize a user input voltage generated by an electronic user input (e.g., the multi-button user input 350) coupled to the port. The first power supply may be configured to bias the electronic sensor for operation, and the second power supply may be configured to supply a power lower than the bias for the electronic sensor for operation. In one configuration, the control circuit may be configured to couple the first power supply to the port in response to the electronic sensor being in operation, and to couple to the second power supply to the port in response to the electronic sensor being not in operation. In another configuration, the control circuit may be configured to selectively couple the first power supply or the second power supply to the detection circuit.

In another configuration, the detection circuit may include a reference voltage generator (442) configured to generate at least one reference voltage for comparing with the user input voltage generated by the electronic user input. The control circuit may be configured to selectively couple the first power supply or the second power supply to the reference voltage generator.

In yet another configuration, the reference voltage generator may be configured to generate a set of reference voltages in a sequence, including the at least one reference voltage, for comparing with the user input voltage generated by the electronic user input (e.g., see FIG. 5). The set of reference voltages may be programmable. In another configuration, the detection circuit may further include a memory for storing results of the set of reference voltages being compared with the user input voltage generated by the electronic user input in the sequence the set of reference voltages is generated. In another configuration, the detection circuit may be further configured to recognize the user input voltage based on the stored results and a predetermined period of time or cycles.

In one example, the electronic apparatus may include the electronic user input (e.g., multi-button user input 350). The electronic user input (e.g., multi-button user input 350) may include a set of buttons, and may configured to generate a user input voltage in response to a button of the set of buttons being pressed. The electronic apparatus may further include the electronic sensor, such as a microphone.

Figure 7:
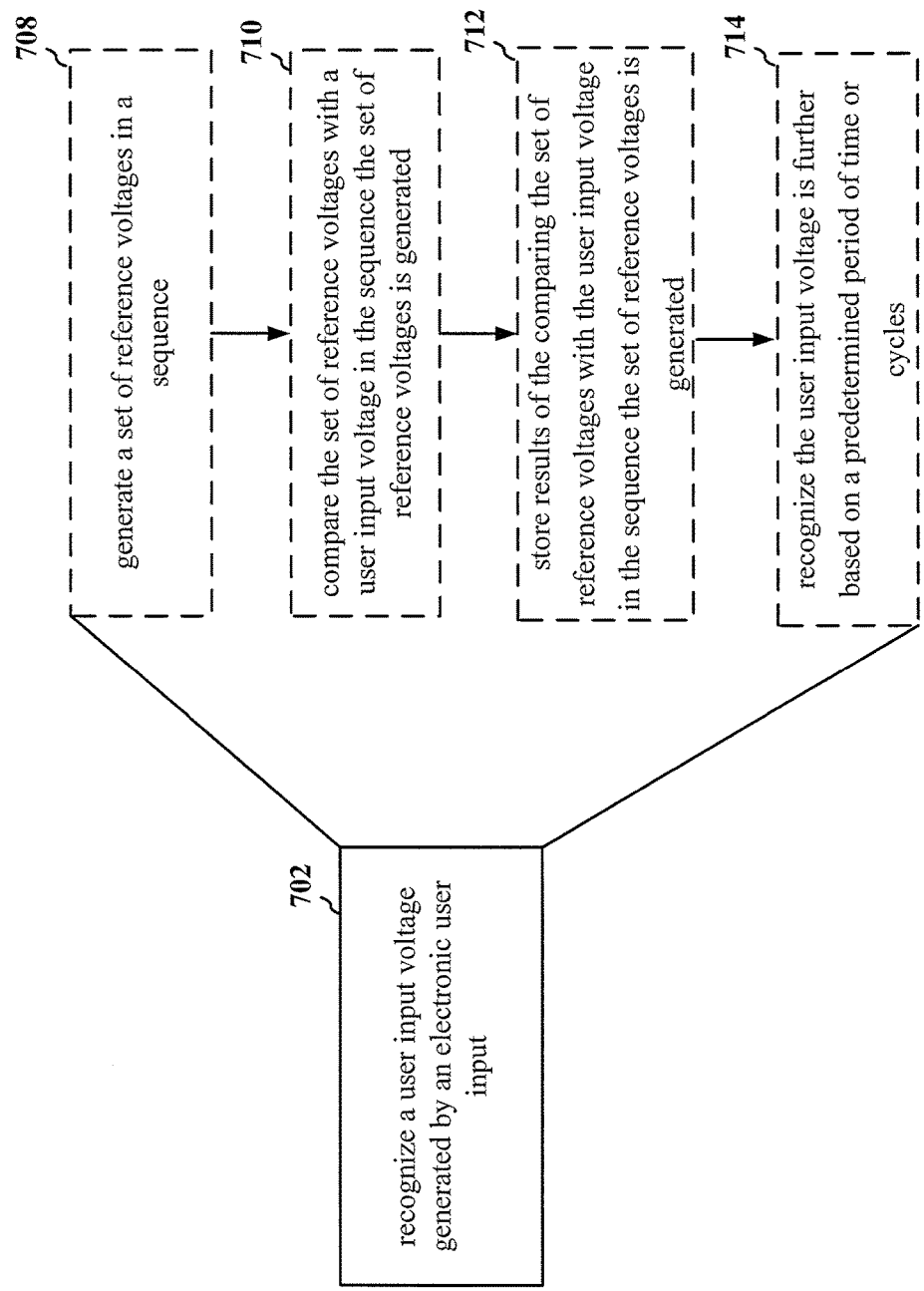
FIG. 7 is a flowchart of the operations of an exemplary embodiment

FIG. 7 is a flowchart of the operations of an exemplary embodiment (e.g., the detection circuit 420). Steps shown in dotted-line may be optional. At 702, a user input voltage (e.g., $V_{MIC}$ 432) generated by an electronic user input (e.g., the multi-button user input 350) is recognized. The recognizing step may include the following steps. At 708, a set of reference voltages is generated in a sequence (e.g., by the reference voltage generator 422). At 710, the set of reference voltages is compared with the user input voltage generated in the sequence the set of reference voltages is generated. At 712, results of the comparing the set of reference voltages with the user input voltage are stored in the sequence the set of reference voltages is generated (e.g., in the memory 430). At 714, the user input voltage is further recognized based on a predetermined period of time or cycles. Examples of these steps are shown in FIGS. 4-6 and the accompanying text.

Figure 8:
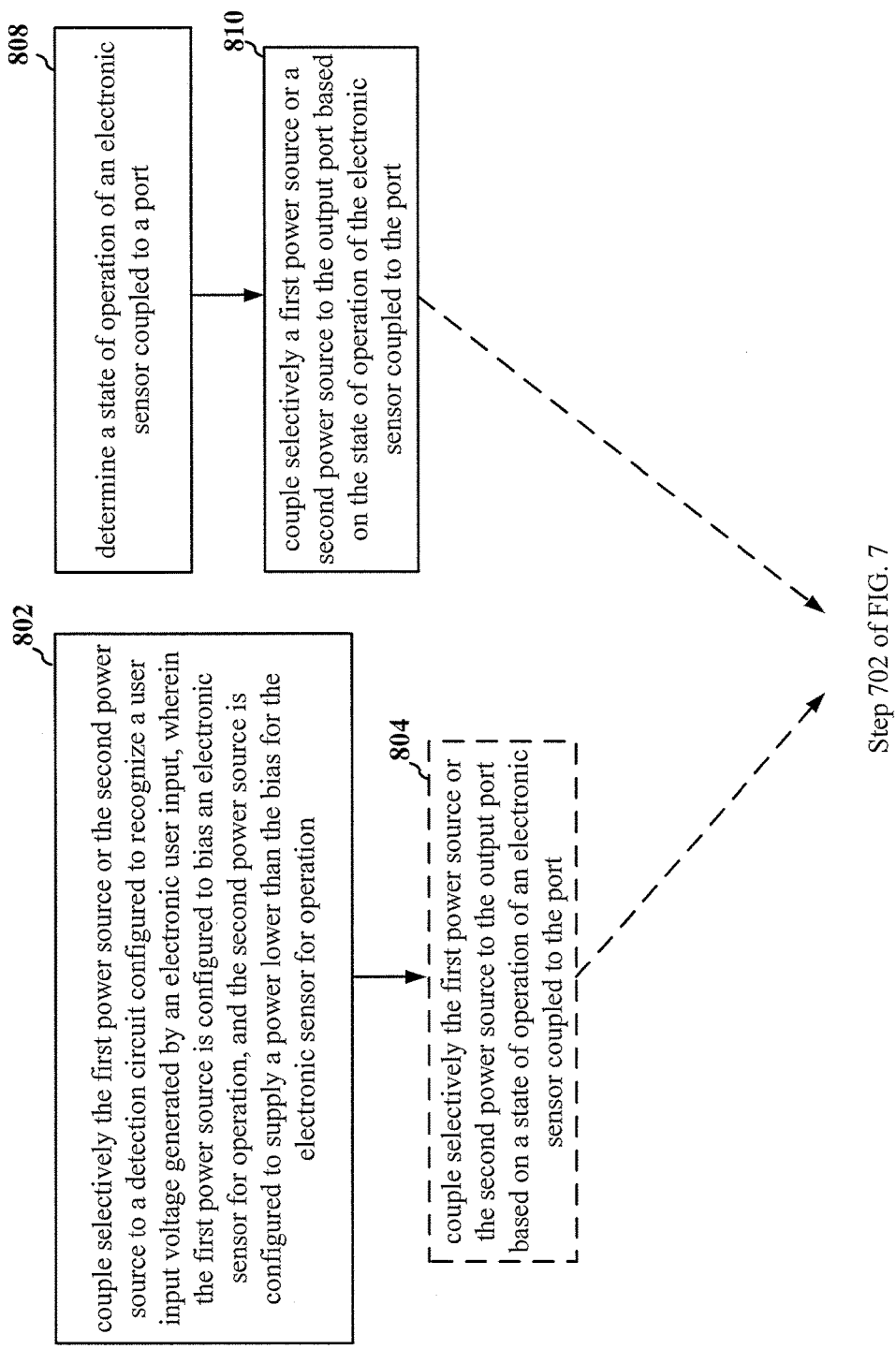
FIG. 8 is a flowchart of the operations of another exemplary embodiment.

FIG. 8 is a flowchart of the operations of another exemplary embodiment (e.g., the control circuit 630). Steps shown in dotted-line may be optional. At 802, the first power source or the second power source is selectively coupled to a detection circuit configured to recognize a user input voltage generated by an electronic user input. The first power source is configured to bias an electronic sensor for operation, and the second power source is configured to supply a power lower than the bias for the electronic sensor for operation. At 804, the first power source or the second power source is selectively coupled to the port based on a state of operation of an electronic sensor coupled to the port. Subsequently, the process may then continue to the step 702 of FIG. 7. At 808, a state of operation of an electronic sensor coupled to a port is determined. At 810, a first power source or a second power source is selectively coupled to the port based on the state of operation of the electronic sensor coupled to the port. Subsequently, the process may then continue to the step 702 of FIG. 7.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An electronic apparatus, comprising:
 a detection circuit configured to recognize a user input voltage generated by an electronic user input, the detection circuit comprising a reference voltage generator including a multiplexer configured to generate a set of reference voltages in a sequence for comparing with the user input voltage generated by the electronic user input, the multiplexer controlled by multiplexer selection signals from a counter to cause the multiplexer to multiplex the set of reference voltages, the detection circuit including a comparator comprising an auto-zero amplifier configured to compare the set of reference voltages and the user input voltage, the auto-zero amplifier comprising:

an operational amplifier;

a first switch coupled between an output of the operational amplifier and an input of the operational amplifier;

a capacitor having a first lead coupled to the input of the operational amplifier and coupled to the first switch;

a second switch configured to selectively couple the reference voltages to a second lead of the capacitor; and a third switch configured to selectively couple a user input voltage to the second lead of the capacitor; and a power supply configured to supply power to the detection circuit.

2. The electronic apparatus of claim 1, wherein the power supply is configured to supply power to the detection circuit continuously without polling.

3. The electronic apparatus of claim 1, wherein the power supply is further configured to supply power to bias an electronic sensor.

4. The electronic apparatus of claim 1, wherein the detection circuit further comprises a memory for storing results of the set of reference voltages being compared with the user input voltage generated by the electronic user input in the sequence the set of reference voltages is generated.

5. The electronic apparatus of claim 4, wherein the detection circuit is further configured to recognize the user input voltage based on the stored results and a predetermined period of time or cycles.

6. The electronic apparatus of claim 1, further comprises the electronic user input, wherein the electronic user input comprises a set of buttons, and is configured to generate the user input voltage in response to a button of the set of buttons being pressed.

7. The electronic apparatus of claim 1, further comprises an electronic sensor, wherein the electronic sensor comprises a microphone.

8. The electronic apparatus of claim 1, wherein the reference voltage generator comprises a voltage divider including a set of coarse resistors connected in series and a set of fine resistors connected in series, the set of coarse resistors and the set of fine resistors configured to generate the set of reference voltages in a sequence, the set of fine resistors configured to be selectively coupled across a coarse resistor of the set of coarse resistors.

9. The electronic apparatus of claim 1, wherein the electronic user input comprises a user input switch.

10. The electronic apparatus of claim 1, wherein the electronic user input comprises a user input device connected to the electronic apparatus and configured to provide user input to the electronic apparatus.

* * * * *